United States Patent [19]

Reavell

[11] Patent Number: 4,766,413

[45] Date of Patent: Aug. 23, 1988

[54] SCHOOL BUS STOP SIGN CONTROL APPARATUS

[75] Inventor: James Reavell, Campbellford, Canada

[73] Assignee: School Bus Parts Co. of Canada Inc., Campbellford, Canada

[21] Appl. No.: 33,110

[22] Filed: Apr. 1, 1987

[51] Int. Cl.$^4$ .............................................. G08B 5/22
[52] U.S. Cl. .................................. 340/130; 340/133; 318/282; 180/281; 180/289; 246/125; 116/28 R
[58] Field of Search .................. 340/130, 120, 142, 11, 340/52 R, 87, 84, 133; 318/34, 54, 282; 40/459, 460, 470, 601; 49/26, 28; 180/271, 281, 289; 246/125-127; 116/28 R, 63 R

[56] References Cited

U.S. PATENT DOCUMENTS

| | | | |
|---|---|---|---|
| 2,155,617 | 4/1939 | Roan et al. | 340/130 |
| 2,243,472 | 5/1941 | Roan et al. | 340/130 |
| 3,153,398 | 10/1964 | Verne Runkle et al. | |
| 4,559,518 | 12/1985 | Latta, Jr. | 340/130 |

Primary Examiner—Donnie L. Crosland
Attorney, Agent, or Firm—Michael Ebert

[57] ABSTRACT

Control apparatus for a hinged stop sign mounted on the side of a school bus to cause the sign to swing out to an outstretched position when the bus door is opened to load or unload passengers and to return the sign to its retracted position when the door closes. The apparatus is provided with a unidirectional motor operatively coupled to the hinged sign through an eccentric drive by a link arm having associated therewith two normally-closed limit switches, whereby in the course of a motor operating cycle, the stop sign is caused to swing out to its outstretched position, at which point one limit switch opens, and then returns to its retracted position, at which point the other limit switch opens. The limit switches are included in a control circuit which supplies power to the motor. The control circuit is responsive to a door switch associated with the bus door so that when the door is open, the door switch is then closed, and power is supplied to the motor through one limit switch until the sign reaches its outstretched position, at which point this limit switch is opened to cut off the motor. When the door is closed and the door switch is then open, power is supplied to the motor through the other limit switch until the sign reaches its retracted position, at which point the motor is then cut off. Thus, the operation of the sign is coordinated with that of the bus door to provide a stop signal when the need therefor arises.

6 Claims, 4 Drawing Sheets

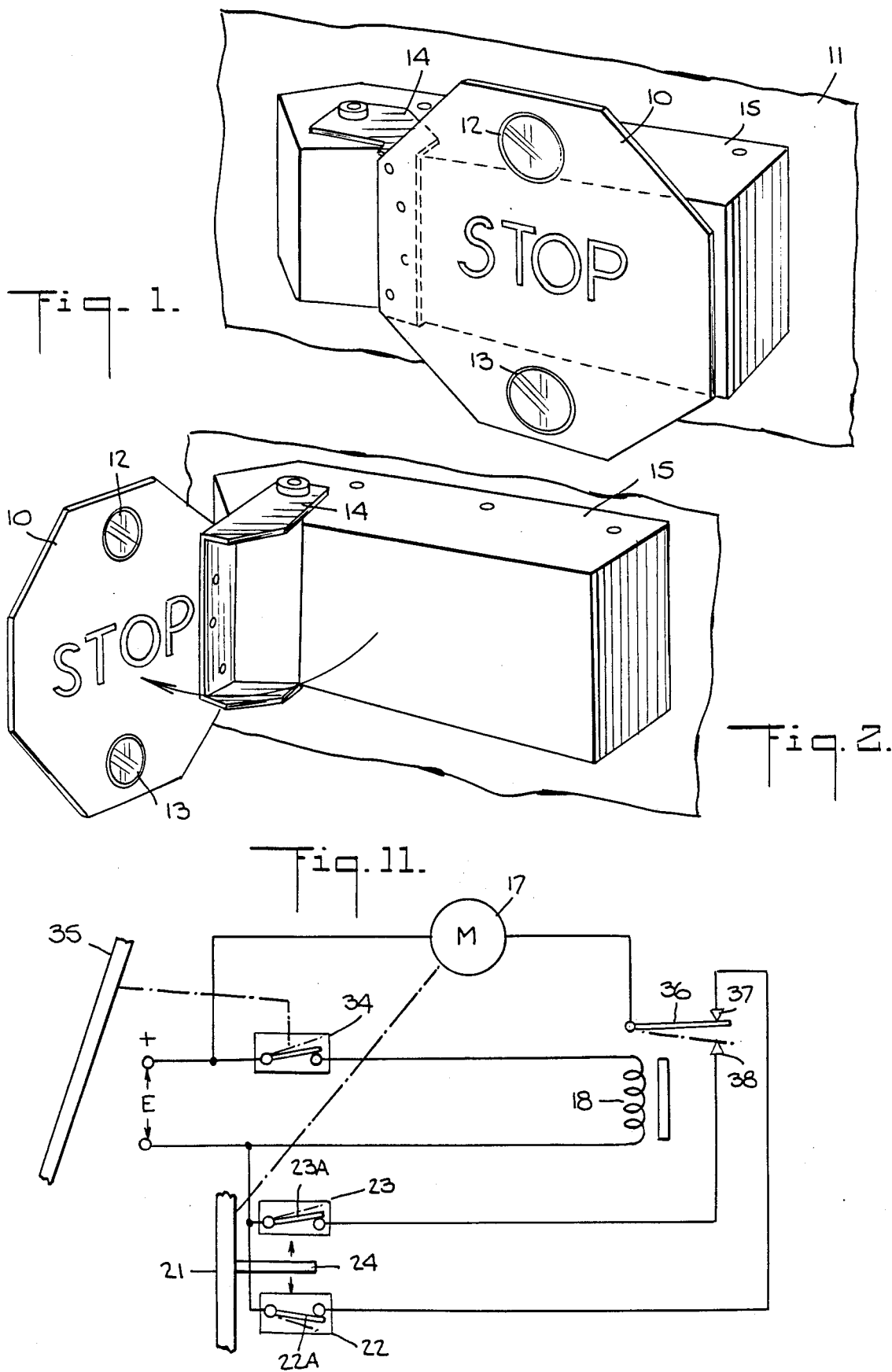

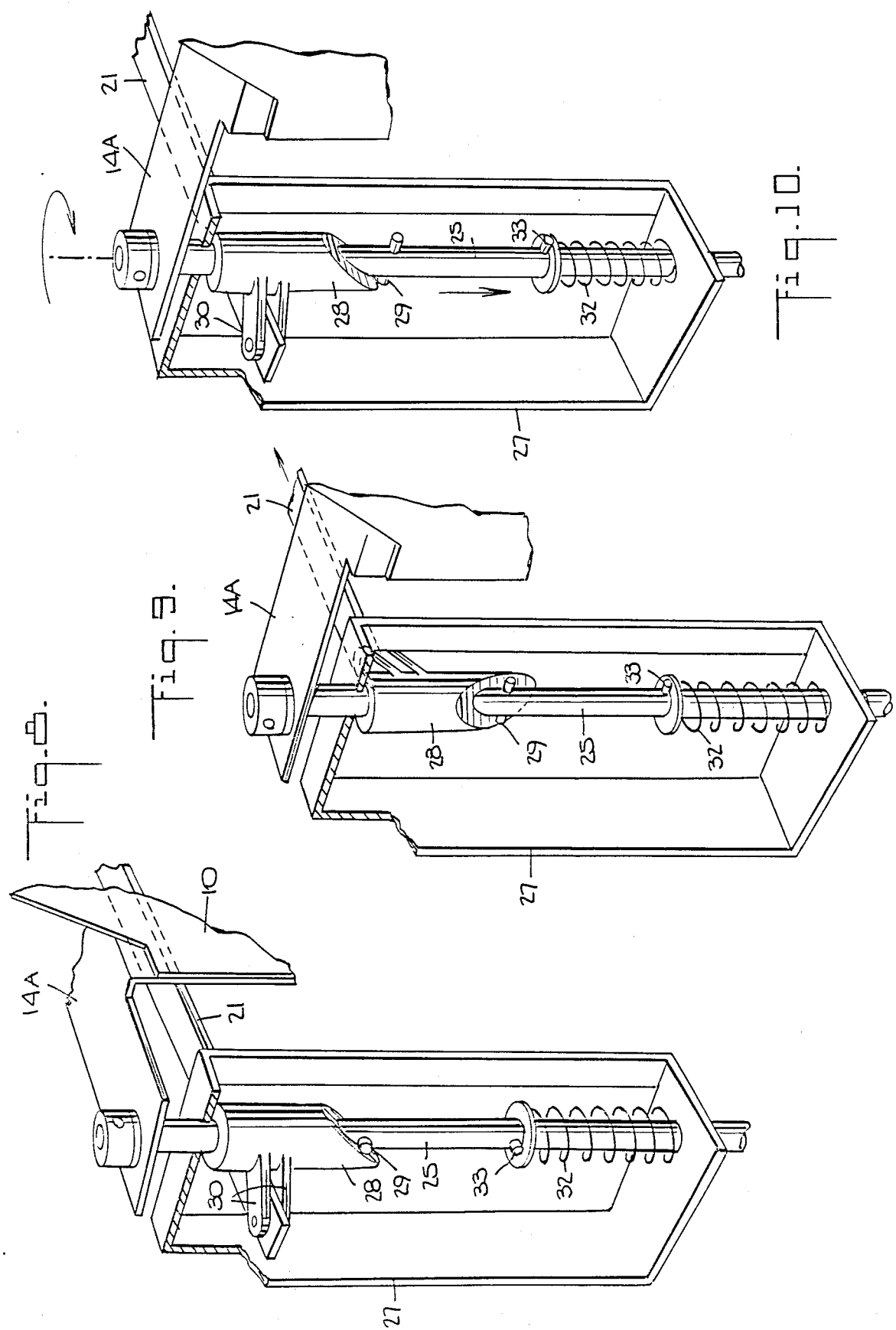

SCHOOL BUS STOP SIGN CONTROL APPARATUS

BACKGROUND OF INVENTION

1. Field of Invention

This invention relates generally to apparatus for controlling the operation of a stop sign on a school bus, and more particularly to a control apparatus which when the door of the bus is opened to unload or load passengers, this causes the stop sign to swing out to an outstretched position to provide a signal alerting nearby vehicles, and which when the bus door is closed, then causes the sign to return to its retracted position.

2. Status of Prior Art

School buses pick up or discharge children attending a school serviced by the bus at various points along a route running through the community in which the school is situated. As a safety measure, school buses have for many years been equipped with a stop sign mechanism under the control of the bus driver, the mechanism acting to swing out the stop sign from its normally retracted position against the side of the bus to an outstretched position to provide a signal alerting drivers of nearby vehicles that children are entering or alighting the bus.

U.S. Pat. Nos. 2,384,689 and 3,094,683 are illustrative of manually-operated school bus sign devices, while U.S. Pat. No. 2,252,529 discloses a hydraulically-operated school bus sign.

It is also known to provide motor-operated school bus signs, such apparatus being illustrated in U.S. Pat. Nos. 2,281,717 and 4,138,668. Of greatest prior art interest in this regard is the 1982 U.S. Pat. No. 4,339,744 to Latta, Jr. In this patent, the stop sign mounted on the side of the bus is operated by an unidirectional DC motor and a linkage associated with the sign. This linkage in conjunction with limit switches acts to deploy and retract the stop sign.

The control apparatus disclosed in the Latta et al. patent is operated by the driver by means of a switch having a "deploy" and a "retract" position. The arrangement is such that when the driver sets the switch to its "deploy" position, this also acts to actuate sign lights and bus lights to cause them to flash. These flashing light signals in combination with the outstretched stop sign warn nearby cars that the door of the school bus is then open and children are being loaded or unloaded.

One practical drawback of the Latta et al. stop sign control apparatus is that it is driver operated. Should the bus driver, as sometimes occurs, fail to operate the stop sign switch before opening the door, no warning signal will then be given to alert nearby car drivers. A school bus driver's job is made difficult by the fact that his young passengers are not always well behaved; for school children are often noisy and hyperactive. Hence the conditions which prevail in a bus may distract a bus driver and induce him to forget to operate the stop sign.

Another practical drawback of the Latta et al. stop sign is that it can be damaged or rendered inoperative if the outstretched stop sign is not made to retract by the motor linked thereto but is forced to retract either accidentally or deliberately while the motor is cut off. This action may break the linkage between the stop sign and the motor.

SUMMARY OF INVENTION

In view of the foregoing, the main object of this invention is to provide a control apparatus for a school bus stop sign which is automatically responsive to the opening and closing of the bus door, whereby when the door is opened, the control apparatus then acts to swing out the stop sign to its outstretched position; and when the door is closed, the apparatus then acts to return the sign to its normally retracted position on the side of the bus body.

Thus, a control apparatus in accordance with the invention does not require the bus driver to carry out a separate stop sign switching action; for the driver, by opening and closing the bus door brings about an automatic operation of the stop sign.

More particularly, an object of this invention is to provide a bus stop sign control apparatus in which a unidirectional motor is operatively coupled to the hinged sign through an eccentric drive and a link arm, the arm being associated with limit switches so that in the course of a motor operating cycle the sign is swung to its outstretched position and then returned to its normally retracted position.

Also an object of this invention is to provide a bus stop sign control apparatus which is of simple, efficient and reliable design whereby the apparatus may be manufactured at low cost and installed without difficulty.

Yet another object of the invention is to provide a break-away coupling between the link arm operated by the motor and the shaft of the hinge mechanism for the sign, so that should the sign be improperly forced to retract, the coupling will then be decoupled to prevent damage to the link arm.

Briefly stated, these objects are attained in a control apparatus for a hinged stop sign mounted on the side of a school bus to cause the sign to swing out to an outstretched position when the bus door is opened to load or unload passengers and to return the sign to its retracted position when the door closes. The apparatus is provided with a unidirectional motor operatively coupled to the hinged sign through an eccentric drive by a link arm having associated therewith two normally-closed limit switches, whereby in the course of a motor operating cycle, the stop sign is caused to swing out to its outstretched position, at which point one limit switch opens, and then returns to its retracted position, at which point the other limit switch opens. The limit switches are included in a control circuit which supplies power to the motor. The control circuit is responsive to a door switch associated with the bus door so that when the door is open, the door switch is then closed, and power is supplied to the motor through one limit switch until the sign reaches its outstretched position, at which point this limit switch is opened to cut off the motor. When the door is closed and the door switch is then open, power is supplied to the motor through the other limit switch until the sign reaches its retracted position, at which point the motor is then cut off. Thus, the operation of the sign is coordinated with that of the bus door to provide a stop signal when the need therefor arises.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a front view of a stop sign control apparatus in accordance with the invention in which the stop sign is in its retracted position;

FIG. 2 shows the stop sign in its outstretched position;

FIG. 8 illustrates, in perspective, the hinge mechanism when the sign is retracted;

FIG. 9 shows the hinge mechanism when the sign is outstretched;

FIG. 10 shows the hinge mechanism when the sign is swung away by force; and

FIG. 11 is a schematic diagram of the motor control circuit for the stop sign apparatus.

DESCRIPTION OF INVENTION

Figure 3:
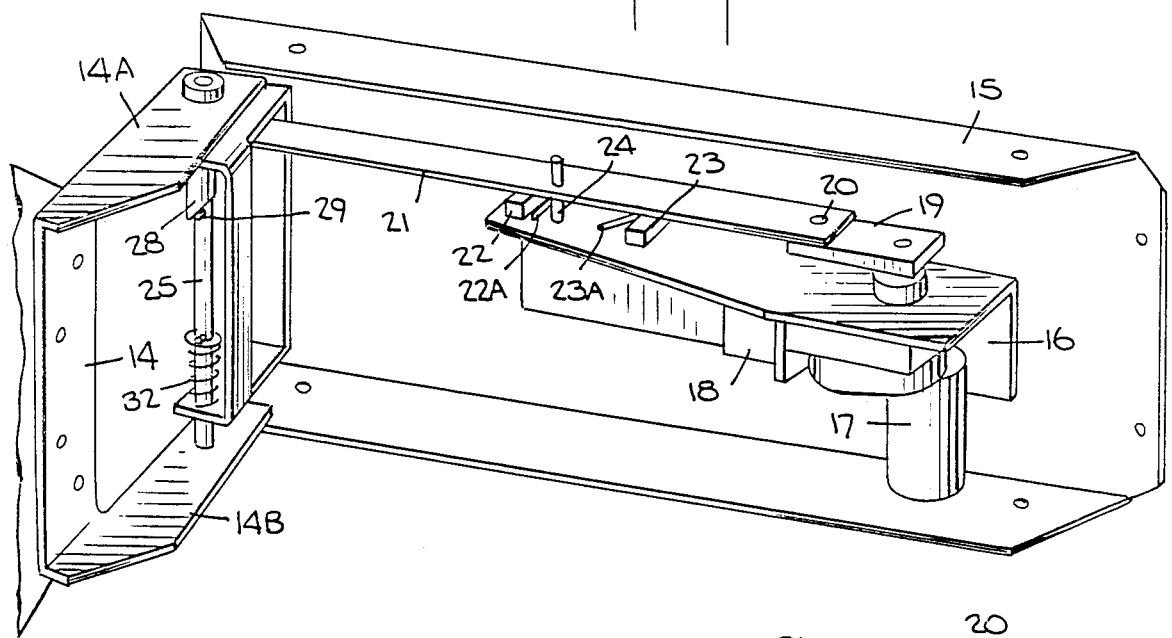
FIG. 3 is a perspective view, with the case of the apparatus opened to show the bracket on which the motor and the relay of the apparatus is mounted.
Figure 4:
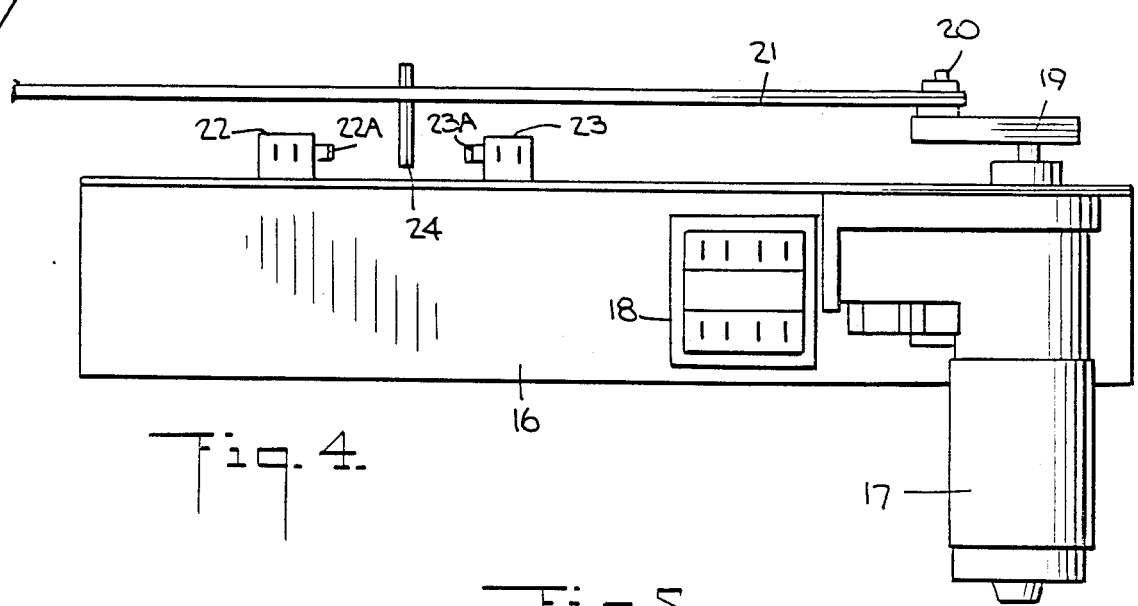
FIG. 4 is a top view of the bracket.
Figure 5:
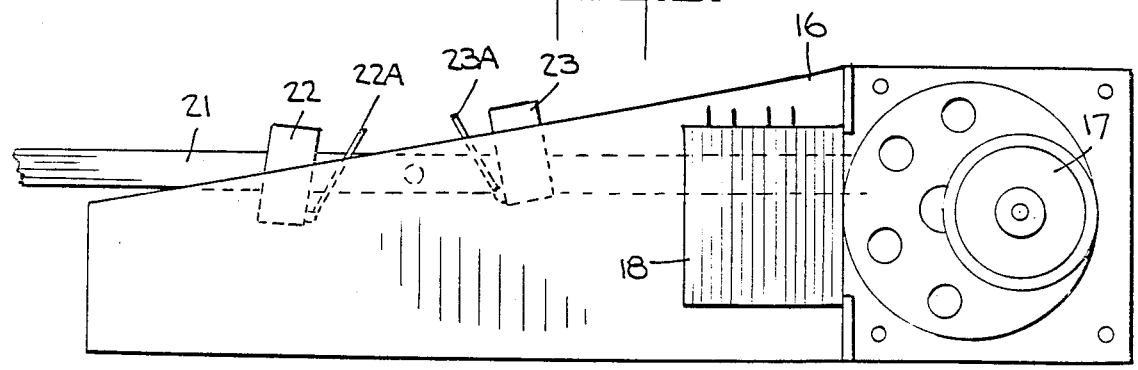
FIG. 5 is a side view of the bracket.

The Stop Sign Control Apparatus:

Referring now to FIG. 1, there is shown a bus stop sign control apparatus in accordance with the invention for swinging a stop sign 10 from its retracted position against the side of a bus to an outstretched position. Stop sign 10 in the embodiment shown is in the form of an octagonal plate provided with flasher lights 12 and 13 above and below the STOP indication. Sign plate is bolted to the hinge plate 14 of a hinge mechanism. The apparatus 11 is supported on a rectangular case 15 which is mounted on the side of the bus.

In operation, when the door of the bus is opened to load or unload passengers, then sign 10 is caused by the apparatus to swing out until it reaches the outstretched position, as shown in FIG. 2, in which position it serves to alert nearby vehicles. At the same time, lights 12 and 13 on the sign are caused to flash periodically to provide a flashing light signal to warn the drivers of nearby vehicles. The lights appear on both sides of the sign.

As shown in FIG. 3, mounted within casing 15 adjacent the rear end thereof is a bracket 16 on which is supported a DC unidirectional gear motor 17 and a relay 18. Keyed to the shaft of motor 17 is an eccentric drive arm 19 provided with an off-center pivot pin 20 coupled to one end of a link arm 21. Thus when motor 17 is energized, the resultant rotation of eccentric arm 19 causes link arm 21 to undergo a forward stroke to the left and then a return stroke to the right in the course of each cycle of rotation.

Normally-closed limit switches 22 and 23 are supported in spaced relation against the side of bracket 16 adjacent link arm 21. Limit switches 22 and 23 are provided with depressible actuators 22A and 23A, respectively, which face each other and when engaged act to open the switches. These actuators are alternately engaged by an actuator pin 24 laterally mounted on link arm 21. Link arm 21 is operatively coupled at its other end to the shaft of the hinge mechanism for the stop sign and it acts in the course of its return stroke to swing out the stop sign to its outstretched position, and in the course of its forward stroke to return the stop sign to its retracted position.

The relation of actuator pin 24 to actuators 22A and 23A is such that when the stop sign is fully outstretched, limit switch 22 is then actuated and caused to open, and when the sign is fully retracted, then limit switch 23 is actuated and caused to open.

Limit switches 22 and 23 cooperate with relay 18 and a bus door switch to control the supply of power to the motor in a manner whereby when the bus door is opened, the motor then causes the stop sign to swing out to its outstretched position, at which point the motor is disconnected, and when the bus door is closed, the motor then causes the stop sign to return to its retracted position, at which point the motor is disconnected.

Figure 6:
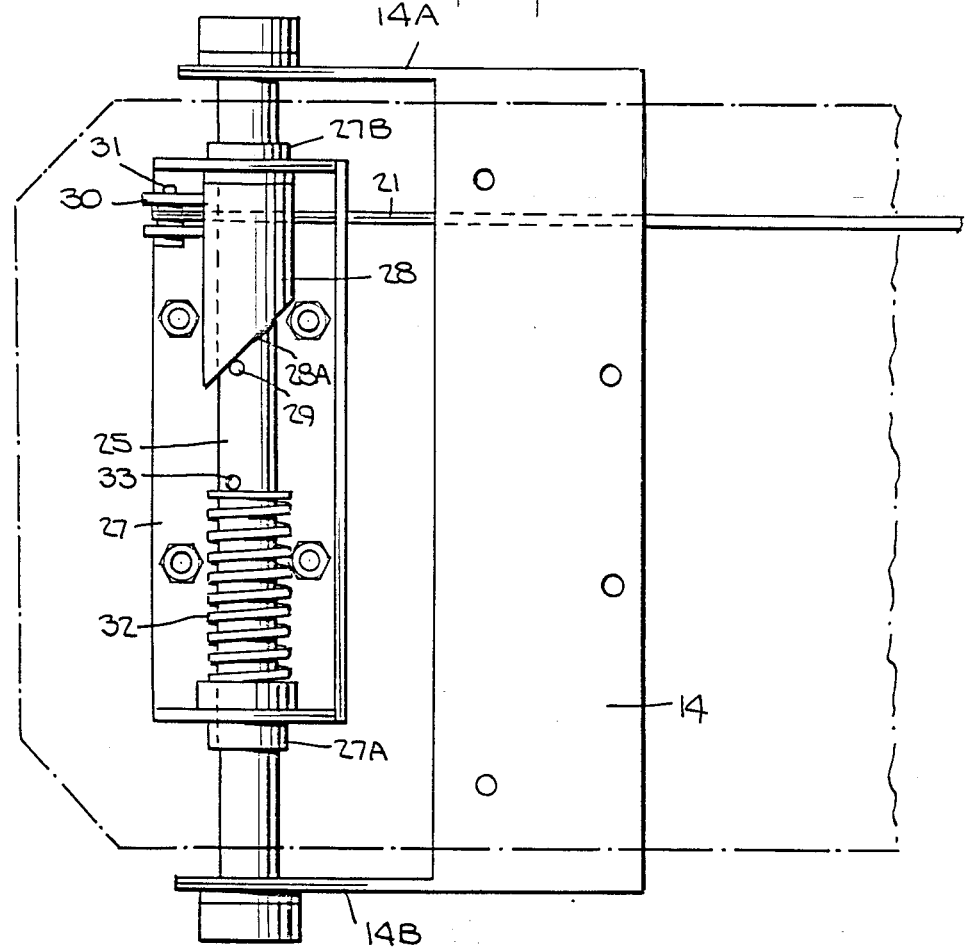
FIG. 6 is a top view which shows the hinge mechanism for supporting the stop sign.
Figure 7:
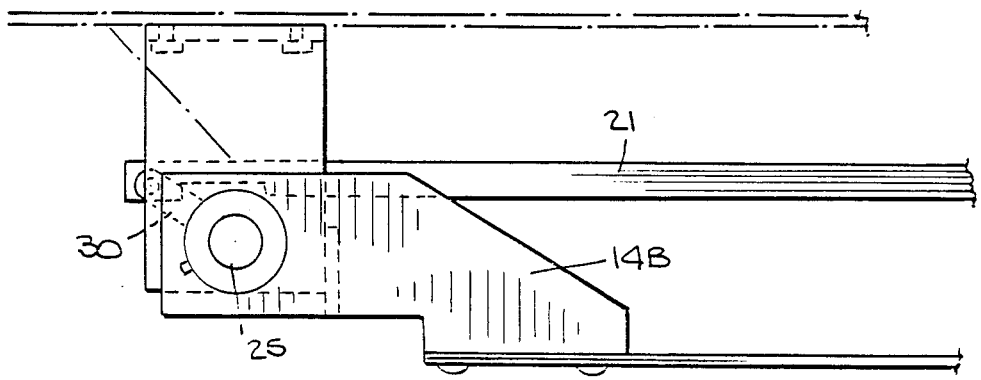
FIG. 7 is a side view of the hinge mechanism.

The Hinge Mechanism:

Referring now to FIGS. 3, 6 and 7, it will be seen that hinge plate 14 in which the stop sign is mounted is provided with a pair of spaced side arms 14A and 14B which are attached to opposite ends of a hinge shaft 25. Shaft 25 is supported for rotation by end bearings 27A and 27B on a bracket 27 bolted to the bottom wall of the casing.

Freely mounted on shaft 25 adjacent bearing 27B is a cylindrical sleeve 28 whose outer end 28A is sloped to provide a cam surface that is normally engaged by a follower pin 29 secured to shaft 25 and extending therethrough. Attached to sleeve 28 and extending laterally therefrom is a yoke 30 whose parallel legs are pivotally connected to the end of link arm 21 by a pivot pin 31. Surrounding shaft 25 and positioned adjacent bearing 27A is a helical spring 32, one end of which is attached to bearing 27A and the other end to a stud 33 anchored on shaft 25.

FIG. 8 shows the state of the hinge mechanism when the bus stop sign 10 is retracted. When link arm 21 is caused to shift to the right by motor 17, as shown in FIG. 9, this causes sleeve 28 and shaft 25 to turn and thereby swing out the hinge plate 14 supporting the stop sign until the stop sign reaches its outstretched position (FIG. 2). And when the link arm 21 is then caused to shift to the left, this causes the stop sign to return to its retracted position (FIG. 1).

As shown in FIG. 10, spring 32 in combination with sleeve 28 acts as a break away coupling with respect to link arm 21; for should an attempt be made to physically retract the outstretched stop sign, the force for this purpose will not be transmitted by sleeve 28 through yoke 30 to the link arm. The reason a break away action occurs is that when shaft 25 is rotated, not by rotation of sleeve 28 whose cam surface engages pin 29 on the shaft, but by rotation of shaft 25 by means of hinge plate 14, then this rotation causes stud 33 on the shaft to be angularly displaced to contract spring 32 and thereby axially shift the shaft to bring about disengagement of the sleeve cam 28A from the follower pin 29. Hence in this instance, the shaft is decoupled from link arm 21 and no damage is done to this link arm or the devices associated therewith.

Motor Control Circuit:

Referring now to FIG. 11, there is shown the control circuit for motor 17 which when energized causes link arm 21 to reciprocate to cause the hinged bus stop sign to swing out at its outstretched position and then to return to its retracted position. The actuator pin 24 on the link arm causes the normally-closed limit switch 22 to open when the outstretched position is reached and causes the normally-closed limit switch 23 to open when the retracted position is reached.

The electromagnet coil of relay 18 is connected in series with a door switch 34 to a power source E which in the case of a school bus is the battery of the vehicle.

Door switch 34 is operatively associated with the door 35 of the bus so that when the door is open, the switch is closed (as shown), and when the door is closed the door switch is then open.

Relay 18 of the single-pole, double-throw type and its movable contact 36 is connected through motor 11 to the positive terminal of power supply E. Movable contact 36 normally engages a fixed contact 37 which is connected through limit switch 23 to the negative terminal of supply E. When relay 18 is energized upon closure of door switch 34, its movable contact 36 then engages a fixed contact 38 which is connected through limit switch 23 to the negative terminal of supply E.

Limit switches 22 and 23 are shown in their normally closed state. We shall at the outset assume that bus door 35 is closed by the driver, this action causing door switch 34 to open, as a consequence of which relay 18 is de-energized and its movable contact 36 then engages fixed contact 37. In this condition, motor 11 is powered through closed limit switch 23 and the motor then operates through link arm 21 to return the stop sign to its retracted position, at which point actuator pin 24 on the link arm engages the actuator on limit switch 23 to open this switch and cut off the motor.

The bus stop sign remains in its retracted position as long as the bus door is closed. When the driver opens the bus door 35, this action causes door switch 34 to close and thereby energizes relay 18 to cause movable contact 36 to engage fixed contact 38. As a result, motor M is now again energized, this time through closed limit switch 22. The motor then acts through link arm 21 to swing the bus sign to its fully outstretched position, at which point the actuator pin 24 on the link arm engages the actuator 22A of limit switch 22 to open this switch and cut off the motor. The stop sign remains in its outstretched position and the motor remains inactive until the door is again closed, thereby opening door switch 34 to deenergize relay 18, as a result of which motor 17 resumes operation, for it is now powered through contact 37 and closed limit switch 23.

When link arm 25 operated by motor 17 causes the stop sign to reach its fully retracted position, actuator pin 24 then engages the actuator 23A of limit switch 23 to open this switch and cut off the motor, thereby maintaining the bus stop sign at its retracted position until such time as the bus door is again opened.

Thus, the driver of the bus need take no separate action to swing out or retract the stop sign, for the operation of the stop sign is automatically coordinated with the opening and closing of the bus door. The motor control circuit is linked to a flasher unit for the bus light and for lights in the stop sign in the manner disclosed in the Latta Jr. et al. patent, or by any other suitable circuit means, so that whenever the stop sign is fully outstretched, the flasher unit is then actuated.

While there has been shown and described a preferred embodiment of a school bus stop sign control apparatus in accordance with the invention, it will be appreciated that many changes and modifications may be made therein without, however, departing from the essential spirit thereof. Thus, while it is desirable to provide a door switch to control the operation of the stop sign, in practice one may use a driver-operated manual switch for this purpose.

Also, the control apparatus in accordance with the invention can be used for traffic control purposes other than that provided by a stop sign. Thus, a guard rail may be mounted on the hinge mechanism, and by means of a selective control switch, caused either to swing out to an outstretched position to arrest the flow of traffic or to a retracted position to permit such flow.

I claim:

1. A stop sign control apparatus mountable on the side of a school bus and provided with a hinge mechanism which is caused by the apparatus to swing the sign to an outstretched position when the door of the bus is opened and to return the sign to its retracted position when the door is thereafter closed, said apparatus comprising:
   A. a control switch which is closed when the door is open and is open when the door is closed;
   B. a unidirectional DC motor coupled through an eccentric drive by an elongated link arm to the hinge mechanism to cause the sign in response to movement of the link arm in one direction to swing toward its outstretched position and in response to movement of the link arm in the reverse direction to return to its retracted position;
   C. a control circuit associated with the control switch to connect a DC power supply to the motor, said circuit including first and second normally-closed limit switches operatively coupled to the link arm whereby said first limit switch is caused to open when the sign reaches its outstretched position and said second limit switch is caused to open when the sign reaches its retracted position, and means connecting said power supply to said motor either through said first or second limit switch whereby when the control switch is open, said first limit switch is caused to open when the sign reaches its outstretched position to cut off the motor, and when the control switch is closed, said second limit switch is caused to open when the sign reaches its retracted position to cut off the motor, said limit switches being mounted in spaced relation at a site intermediate said motor and said hinge mechanism and having depressible actuators which face each other, said link arm being provided with an actuator pin which projects into the space between the actuators and moves back and forth in this space to alternately engage the actuators.

2. Apparatus as set forth in claim 1, wherein said control switch is a door switch which is operatively associated with the door.

3. Apparatus as set forth in claim 1, wherein said control circuit includes a relay which is connected through the control switch to said power supply and is energized only when the control switch is closed, said relay when energized connecting said motor to the power supply through the second limit switch, and when de-energized connecting said motor to the supply through the first limit switch.

4. A stop sign as set forth in claim 1, wherein said motor is a gear motor, and said eccentric drive is formed by an eccentric arm mounted on the shaft of the motor and an off-center pivot pin on the eccentric arm coupled to the link arm.

5. A stop sign as set forth in claim 1, wherein said hinge mechanism includes a hinge shaft that is coupled by break away means to the link arm whereby the shaft is decoupled from the link arm when the outstretched sign is forcibly retracted.

6. A stop sign as set forth in claim 5, wherein said break away means is constituted by a sleeve freely mounted on the shaft and having a cam surface at one end which normally engages a follower pin on the shaft, said sleeve being coupled to the link arm whereby when turning of the sleeve causes the shaft to turn, and a helical spring mounted on the shaft and contracting when the outstretched sign is forcibly retracted to axially displace the shaft and thereby decouple the sleeve from the follower pin.

* * * * *

Dedication 4,766,413.—*James Reavell*, Campbellford, Canada. SCHOOL BUS STOP SIGN CONTROL APPARATUS. Patent dated Aug. 23, 1988. Dedication filed May 30, 1989, by the assignee, School Bus Parts Co. of Canada Inc.

Hereby dedicates to the Public the remaining term of said patent.
[*Official Gazette August 8, 1989*]